(12) United States Patent
Lam

(10) Patent No.: US 10,997,518 B2
(45) Date of Patent: May 4, 2021

(54) METHOD FOR PREDICTING OIL AND GAS RESERVOIR PRODUCTION

(71) Applicant: Duc Lam, Pearland, TX (US)

(72) Inventor: Duc Lam, Pearland, TX (US)

( * ) Notice: Subject to any disclaimer, the term of this patent is extended or adjusted under 35 U.S.C. 154(b) by 95 days.

(21) Appl. No.: 16/269,326

(22) Filed: Feb. 6, 2019

(65) Prior Publication Data

US 2019/0251460 A1 Aug. 15, 2019

Related U.S. Application Data

(60) Provisional application No. 62/630,806, filed on Feb. 14, 2018.

(51) Int. Cl.
*E21B 47/04* (2012.01)
*G06F 30/20* (2020.01)
*G06N 7/00* (2006.01)
*G06F 111/08* (2020.01)

(52) U.S. Cl.
CPC ............. *G06N 7/005* (2013.01); *E21B 47/04* (2013.01); *G06F 30/20* (2020.01); *G06F 2111/08* (2020.01)

(58) Field of Classification Search
CPC .......... G06N 7/005; E21B 47/04; G06F 30/20
USPC ....................... 703/2, 10; 705/7.37
See application file for complete search history.

(56) References Cited

U.S. PATENT DOCUMENTS

| | | | | |
|---|---|---|---|---|
| 5,718,726 | A * | 2/1998 | Amon | A61L 27/306 128/898 |
| 8,798,978 | B2 * | 8/2014 | Ertas | E21B 44/00 703/10 |
| 9,910,938 | B2 * | 3/2018 | Morales German .... | G06F 30/20 |
| 2011/0087473 | A1 * | 4/2011 | Jimenez Chavez | E21B 49/00 703/2 |
| 2014/0297235 | A1 * | 10/2014 | Arora | E21B 43/00 703/2 |
| 2018/0202264 | A1 * | 7/2018 | Sarduy | E21B 49/08 |

* cited by examiner

*Primary Examiner* — Albert K Wong
(74) *Attorney, Agent, or Firm* — Hauptman Ham, LLP

(57) ABSTRACT

A method for predicting oil and gas production comprising a new and improved reservoir production modeling and forecasting system, containing a commercialized physics-based forecasting tool, that fully incorporates a complete production analysis system for the evaluation of petroleum reservoir production performance. Said method precisely forecasts production and estimates reserves to maximize profitability, increases the predictability of oil and gas reservoir production, and minimizes errors in production forecasting and booking reserves.

7 Claims, 9 Drawing Sheets

250

260

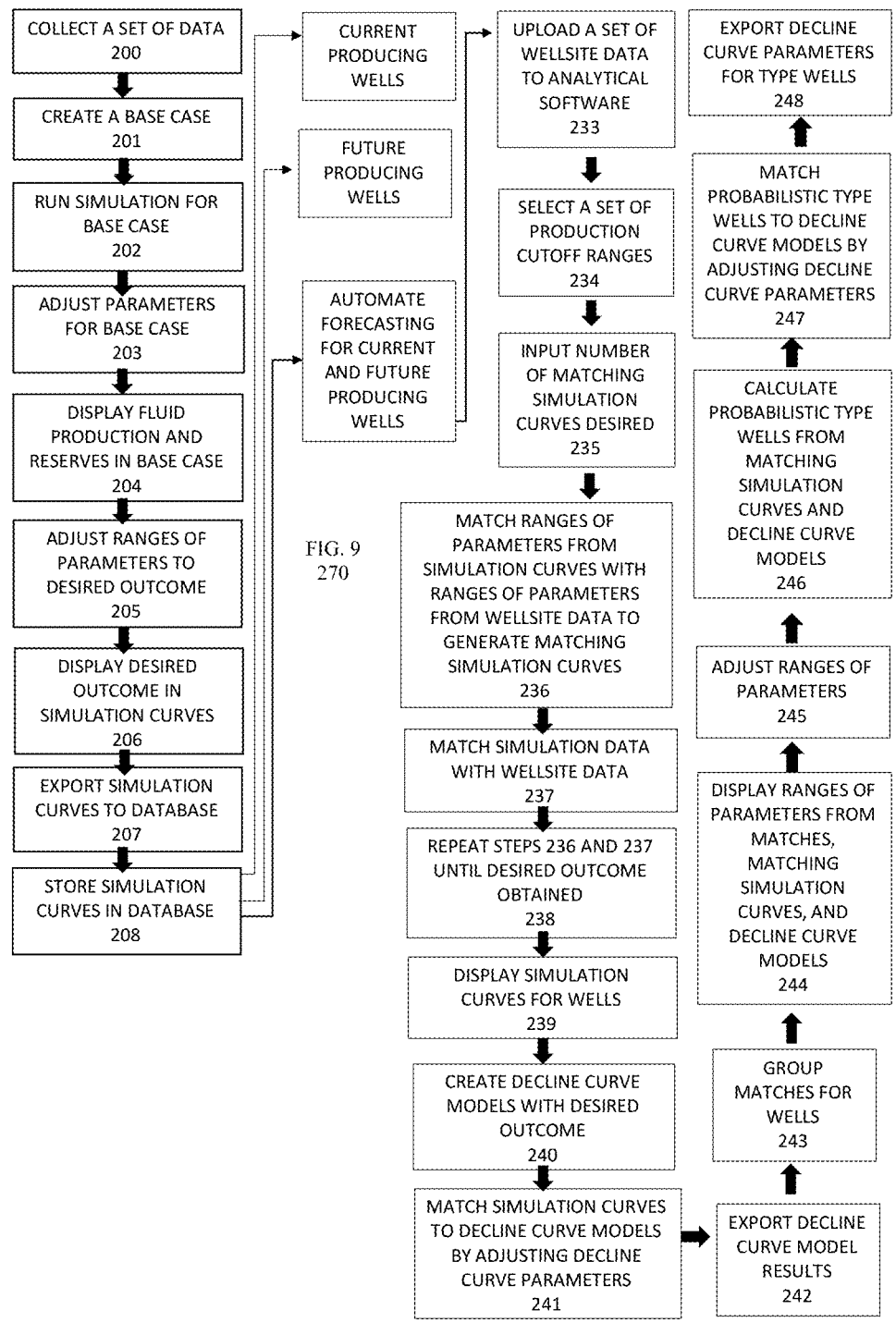

METHOD FOR PREDICTING OIL AND GAS RESERVOIR PRODUCTION

CROSS REFERENCE TO RELATED APPLICATIONS

The present application claims priority to U.S. Patent Application No. 62/630,806 filed on Feb. 14, 2018, which is hereby incorporated by reference in its entirety herein.

FIELD OF THE INVENTION

The disclosure relates to a method for predicting oil and gas reservoir production comprising a complete production analysis system for the evaluation of petroleum reservoir production performance.

BACKGROUND

Oil and gas reservoirs are underground formations of rock containing oil and/or gas. The type and properties of the rock vary by reservoir. An oil or gas reservoir is a zone in the earth that contains sources of oil and gas. When a reservoir is found, one or more wells are drilled into the earth to tap into the source(s) of oil and gas for producing them to the surface.

The surface is an onshore or offshore facility producing conventional or unconventional hydrocarbons from a subterranean reservoir. Conventional applies to oil and gas resources which can be easily extracted, after the drilling operations, just by the natural pressure of the wells and pumping or compression operations. On the other hand, unconventional oil and gas resources are much more difficult to extract from, requiring specialized techniques such as hydraulic fracturing. Hydraulic fracturing, or "fracking," produces fractures in the rock formation that stimulate the flow of oil and natural gas. Unconventional resources include sandstone, shale oil and gas, tight oil, coal bed methane gas, water soluble gas, tight gas sands, and natural gas hydrate.

In the oil and gas industry, significant effort is spent in understanding the location, size, and contents of subsurface hydrocarbon reserves, both in land formations and offshore. The development of large underground reservoirs often requires the building of computer simulation models, in which oil and gas companies have come to depend on in order to enhance their ability to exploit their petroleum reserves.

Modeling of a reservoir typically proceeds through two phases—history matching and prediction. In the history matching phase, past production of a field and its wells is repeatedly modeled with variations to the geological model designed to improve the match between historical data and simulation. Production forecasts are engineering interpretations of volumetric and physical data to predict the performance of hydrocarbon producing (oil and gas) wells. Producing wells with historical data have uncertainty about their decline rates. The production forecasts are saved in a database to perform graphical comparison between multiple forecasts and manual input of empirical parameters. This implementation allows engineers to perform dynamic production analysis, which is effective in business planning and understanding the economic viability of the well.

Machine learning regression algorithms are used to predict the decline curve for a specific wellsite. Machine learning is a purely mathematic approach to forecasting requiring massive amounts of data to "teach" algorithms predictable outcomes based on given parameters using a random forest approach. The decline curve estimates can be predicted by using factors taken from the wellsite data including, but not limited to: Initial Production Water (bbl), Initial Production Oil (bbl), Oil Cumulative Production (bbl), Oil Rate (BOPD), Initial Production Gas (MCF), Gas Cumulative Production (MCF), Gas Rate (MCF/month), and Well Type.

Decline curve analysis (DCA) is a graphical procedure used for analyzing declining production rates and forecasting future performance of oil and gas wells based on past production history. DCA is the oldest and most commonly used tool in analyzing petroleum and gas production. The most common decline curves used in petroleum engineering are Production Rate vs. Time, Cumulative Production vs. Time, and Production Rate vs. Cumulative Production.

Most of the DCA are based on the empirical Arps equations: exponential, hyperbolic, and harmonic equations. Arps is used to predict hydrocarbon reserves and production performance related to oil and gas wells. Almost all conventional decline curve methods/models are developed on the basis of Arps model as follows $q(t)=q_i/(1+bD_it)^{1/b}$, where $q_t$ stands for the total flow rate at time t, $q_i$ denotes the initial flow rate, $D_i$ (1/day) expresses the initial decline rate, and b indicates the Arps decline curve exponent.

Arps is widely used due to its simplicity and low computational costs, however, the prediction results lack accuracy, and thus, are unreliable. The exponential decline curve tends to underestimate reserves and production rates; the hyperbolic and harmonic decline curves have a tendency to overpredict the reservoir performance.

The choice of exponential, hyperbolic, or harmonic curve functions and in addition the choice of multi segment Arps, Fetkovich-Arps types, Bayestan Probabilistic Decline Curve Analysis, Fetkovich, Blasingame and Aganval-Gardner type curve methods, Duong decline, Modified Duong's model, Multi-segment decline, Power law decline (ilk), Logistic growth model, Gringarten type curve analysis, Stretched exponential decline, Agarwal-Gardner type curve analysis, mechanistic Li-Home model, or Wattenharger type curve analysis can be selected and best fit based upon those measurements, depending on user preference.

Type Wells are used in creating appropriate analogues to use in production forecasting. The industry standard practice to construct a type well is to determine a simple arithmetic average production rate at selected times from producing wells. Type wells are used for evaluating reserves, production performance, and optimization analysis. Type Wells represent an average behavior production forecasting profile for a collection of wells for a specified duration or area.

Various techniques have been used in the industry to try and determine if sufficient oil or gas is in a given reservoir to warrant drilling. Petroleum engineers undergo intensive training and highly skilled labor to create reservoir simulation models from scratch. Reservoir simulation models contain data which describe the specific geometry of the rock formation and the wells, the fluid and rock property data, as well as production and injection history of the specific reservoir. Reservoir simulation models are formed by reservoir simulators on a computer program run on a data processing system, such as a high-performance computing (HPC) system. Oil and gas companies must invest in the required infrastructure to empower their engineers with the most advanced HPC resources to perform simulation. HPC capabilities, matched with sophisticated modeling and simulation, amount to extremely high infrastructure costs.

The present disclosure provides a computerized method for determining well performance, in which the program is capable of processing critical data to provide reliable production/reserves estimates.

Additionally, the present disclosure provides a method capable of modeling and implementing operations based on a complex analysis of a wide variety of specific parameters affecting oil and gas production, while minimizing errors in production forecasting and booking reserves that directly impact company financial performance.

It is the object of the present disclosure to incorporate a more dependable, efficient, and accurate reservoir production analysis and predictive method to determine reliable estimates of well production, such as the one described herein.

Furthermore, the present disclosure provides a petroleum reservoir production modeling system that fully incorporates a complete production analysis system for the evaluation of petroleum reservoir production performance, such as the one described herein.

The present disclosure of this application is more fully described below.

SUMMARY

An exemplary embodiment of the present disclosure provides a new and improved reservoir production modeling and forecasting system that fully incorporates a complete production analysis system for the evaluation of petroleum reservoir production performance.

The method of the present disclosure further provides clients with a method for analyzing case study evaluations for critical type well matching, optimization in well spacing, as well as maximizing efficiency and operational performance.

The method of the present disclosure further provides client assistance by scientifically producing a valuation/bid for an asset in order to determine whether the development of a reservoir should be pursued.

Another exemplary embodiment of the present disclosure further provides a new and improved computer implemented method in simulation containing a commercialized physics-based forecasting tool for conventional and unconventional oil and gas, allowing engineers the ability to compare and analyze hundreds of thousands of pre-run simulations from the cloud with actual wellsite parameters and actual wellsite production data.

It is an object of the present disclosure to precisely forecast production and estimate reserves to maximize profitability and effectively and efficiently increase the predictability of oil and gas reservoir production by evaluating the performance of well production through the method described herein.

BRIEF DESCRIPTION OF THE DRAWINGS

For an understanding of embodiments of the disclosure, reference is now made to the following description taken in conjunction with the accompanying drawings, in which:

FIG. 9 illustrates a block diagram of a method for predicting oil and gas reservoir production, to automate forecasting for current and future producing wells, in accordance with the principles of the present disclosure.

In the Figures, the same reference numerals are used for components which are identical or similar, even if a repeated description is superfluous for reasons of simplicity.

DETAILED DESCRIPTION

Figure 1:
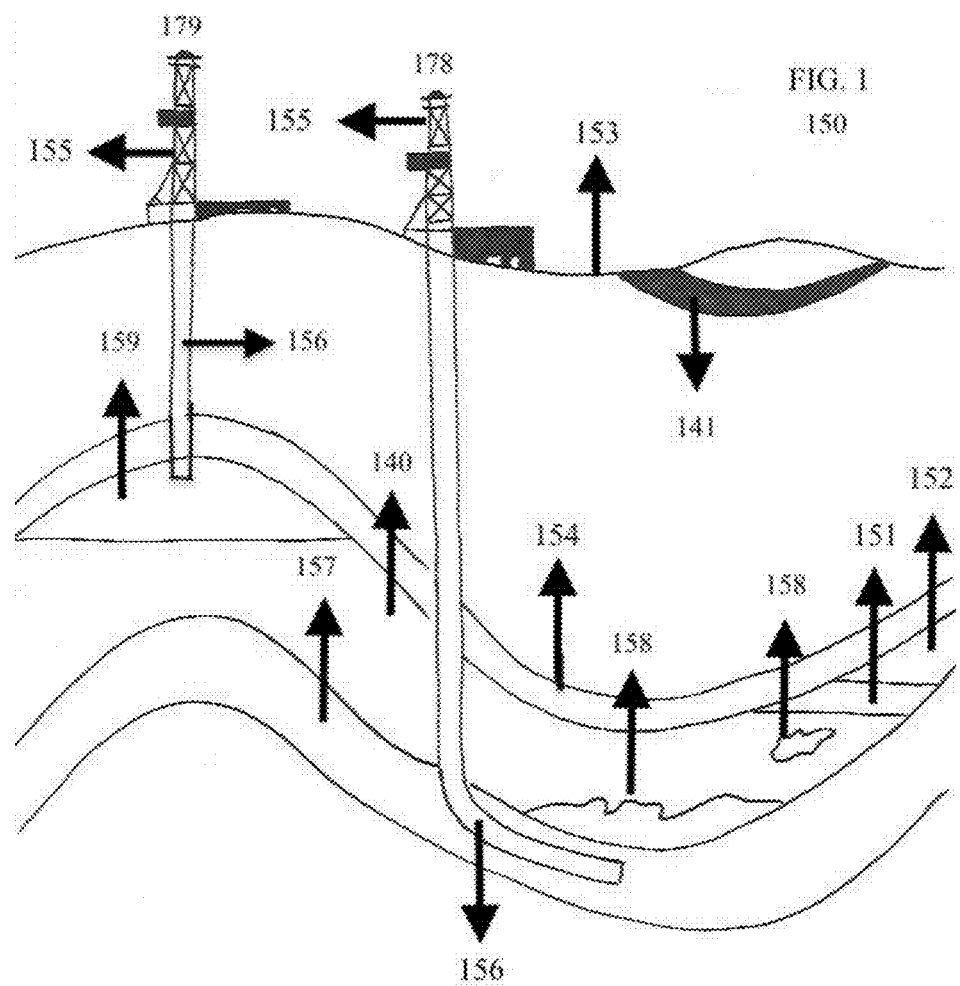
FIG. 1 illustrates a illustrates a wellsite for conventional and unconventional oil and gas, represented by a geological image, in accordance with the principles of the present disclosure.

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. Furthermore, there is no intention to be bound by any expressed or implied theory presented in the preceding technical field, background, brief summary, or the following detailed description.

For ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present disclosure is not limited by the usage of the terms shown below, as all equivalents, synonyms, new developments, and terms or methods that serve the same or a similar purpose are considered to be within the scope of the present claims.

In this description, reference is made to the drawings, wherein like parts are designated with like reference numerals throughout. As used in the description herein and throughout, the meaning of "a," "an," "the," and "said" includes plural reference unless the context clearly dictates otherwise. Also, as used in the description herein, the meaning of "in" includes "into" and "on" unless the context clearly dictates otherwise.

"Analytical software" refers to data analysis software. An example pertinent to the present disclosure includes but is not limited to Spotfire. The analytical software includes a parameters window, wherein the user can define the ranges of the specified parameters in the parameters window.

As used in this description, the terms "component," "database," "module," "system," and the like are intended to broadly capture a computer-related entity, either hardware, firmware, a combination of hardware and software, software, or software in execution. For example, a component may be, but is not limited to being, a process running on a processor, a processor, an object, an executable, a thread of execution, a program, and/or a computer. An example of a database pertinent to the present disclosure includes but is not limited to a Relational Database System.

"Decline curve model" refers to employing the graphical procedure of decline curve analysis. An example pertinent to the present disclosure includes but is not limited to Arps decline curve analysis.

"Decline curve parameters" refer to decline rate, exponential, b factor, Arps, (super) hyperbolic, harmonic, and terminal decline rate. Embodiments can provide a method wherein the generated decline curve is exponential. Embodiments can further provide a method wherein the generated decline curve is hyperbolic. Embodiments can further provide a method wherein the generated decline curve is harmonic. Embodiments can further provide a method wherein the generated decline curve comprises one or more curve segments, wherein each curve segment comprises unique decline curve parameters. An example of decline curve parameters pertinent to the present disclosure includes but is not limited Arps parameters.

"Desired Areas of Interest" refers to a geological area which warrants drilling, based on specific parameter values over which the user may control.

"Desired Outcome" may include a goal or objective of an optimization process. An example of a desired outcome may comprise a set of simulation codes and/or algorithms. Another example of a desired outcome may comprise the errors or uncertainty in predictions of future production, comprising specific parameter values over which the user may control. The desired outcome may then determine one or more actions to be applied to the operation of the system, in which the operation may be adjusted to perform in a manner that most closely meets the goals or objectives of the user.

"History matching" refers to the process of adjusting unknown parameters, such as the ones described below, of a reservoir model until the predictions of the model resemble the past production of the reservoir as closely as possible. The more historical data in the base case that is provided for history matching, the more reliable the "simulation curve" of the present disclosure will be, which serves as a basis for history matching error determination and the reliability of future performance predictions. History matching is extremely time consuming and highly dependent on the skill and knowledge of a reservoir engineer.

"Geological model" is a computer-based representation of a subsurface earth structure, representative of the structure and the behavior thereof. Geological models are used in the optimization and development of a reservoir to determine its structural and petrophysical properties.

Examples of geological model parameters pertinent to the present disclosure include but are not limited to the following: stratigraphic surfaces, flooding surfaces, structural surfaces, boundaries, well data, lithofacies, porosity, permeability, sequence interfaces, fluid contacts, fluid saturation, seismic trace data, subsurface faults, bounding surfaces, and facies variations.

"Production Data" refers to any values that may be measured over the life of the field. Examples include rates of production of oil, gas, and water from individual producing wells, pressure measured vs. depth for specified wells at specified times, pressure at a specified depth measured in a specified well vs. time, seismic response measured at a specified time over a specified area, fluid compositions vs. time in specified wells, flow rate vs. depth for a specified well at specified times.

"Reserves" refers to the estimated quantities of oil and gas to be produced from the current date to the end of life of the well, which geological and engineering data demonstrate with reasonable certainty to be recoverable in future years from known reservoirs.

"Reservoir simulation model," "simulation model," "simulation curves" and the like refer to a mathematical representation of a hydrocarbon reservoir, and the fluids, wells and facilities associated with it. Simulation curves are used to conduct numerical experiments regarding future performance of the hydrocarbon reservoir to determine the most profitable operating strategy. A petroleum engineer managing a hydrocarbon reservoir may create many different simulation models to quantify the past performance of the reservoir and predict its future performance.

"Wellsite" refers to a wellbore penetrating a subterranean formation for extracting fluid from an underground reservoir therein.

In analysis methods according to the present disclosure, production forecast models are generated using reservoir simulation software such as Computer Modelling Group reservoir simulation software or Petrel Reservoir Engineering Eclipse simulation software. Different production forecast models may be used in different embodiments; such other production forecast models may require substitution of or modification of some or all of the below listed attributes for the respective production forecast model's specific parameters.

In analysis methods according to the present disclosure, specified parameters and attributes may be defined. Examples of specified parameters pertinent to the present disclosure include but are not limited to the following: initial reservoir pressure, reservoir depth, bottom-hole flowing pressure, bubble point pressure, dew point pressure, shear stress gradient, pressure gradient, reservoir temperature, reservoir thickness, oil density, gas gravity, rock matrix and natural fracture permeability, non-fracture zone matrix permeability multiplier, vertical and horizontal permeability multipliers, rock matrix/natural fracture porosity, natural fracture spacing, rock matrix/hydraulic fracture initial water saturation, water-oil contact depth, matrix/natural fracture compressibility, well lateral length, cluster spacing, well spacing, number of clusters, hydraulic fracture half-length/height/width/conductivity/permeability, number of frac stage, hydraulic fracture compaction/relative permeability tables, and Pressure-Volume-Temperature (PVT) tables. The ranges of the specified parameters comprise a low and high variable, varied by source.

These data can be collected from a variety of public or private sources and can be used in the generation or prediction of decline curves as described by embodiments herein. Examples of data sources pertinent to the present disclosure include but are not limited to the following: Google, Drilling Info, IHS Markit, Society of Petroleum Engineer Publications, Wolfcamp, Niobrara, Bonespring, Avalon, Lower Spraberry Shale, Cline, Tuscaloosa, Mancos, Eagle Ford, Bakken, Avalon, Scoop/Stack, Marcellus, Haynesville, Utica, Fayetteville, Barnett, Woodford, and Woodford-Barnett.

FIG. 1 illustrates a wellsite 150 for conventional 179 and unconventional 178 oil and gas, represented by a geological image. Drilling rigs 155 are pieces of equipment used to create holes or wellbores 156 in the earth's surface 153. Conventional non-associated gas 159, gas already in the reservoir, does not accumulate with conventional oil 151. Conventional associated gas 152 accumulates in conjunction with the conventional oil 151. The conventional gas accumulations 152, 159 occurs when gas migrates from oil and gas rich shale 157 into sandstone formation 140, which then becomes trapped by an overlying impermeable formation, called a seal 154. Tight sand gas accumulations 158 occur when gas migrates from a source rock into the sandstone formation 140 but is unable to migrate upward due to the permeability in the sandstone. Coalbed methane 141 is generated during the transformation of organic material to coal.

Figure 2:
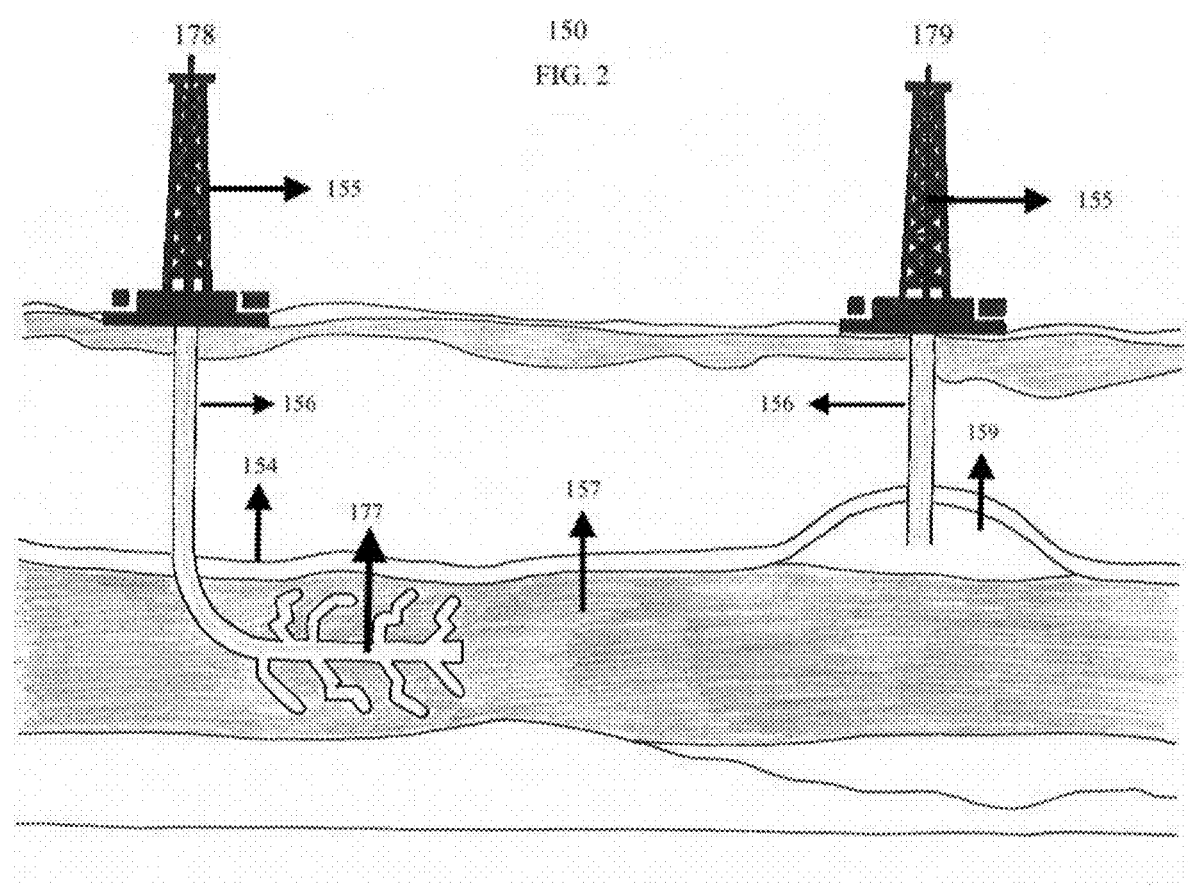
FIG. 2 illustrates another geological image of a wellsite for conventional and unconventional oil and gas, in accordance with the principles of the present disclosure.

FIG. 2 illustrates another geological image of the wellsite 150 displaying the conventional 179 and the unconventional 178 methods of drilling oil and gas. The surface is an onshore or offshore facility producing conventional or unconventional hydrocarbons from a subterranean reservoir. The drilling rigs 155 are machines on the surface used to drill the wellbores 156. The conventional 179 method is the traditional way of drilling oil and gas, extracted by natural pressure, to access the conventional non-associated gas 159. The unconventional 178 method is drilling down the wellbore 156 horizontally, causing fracking 177, in order to access the oil and gas rich shale 157.

Figure 3:
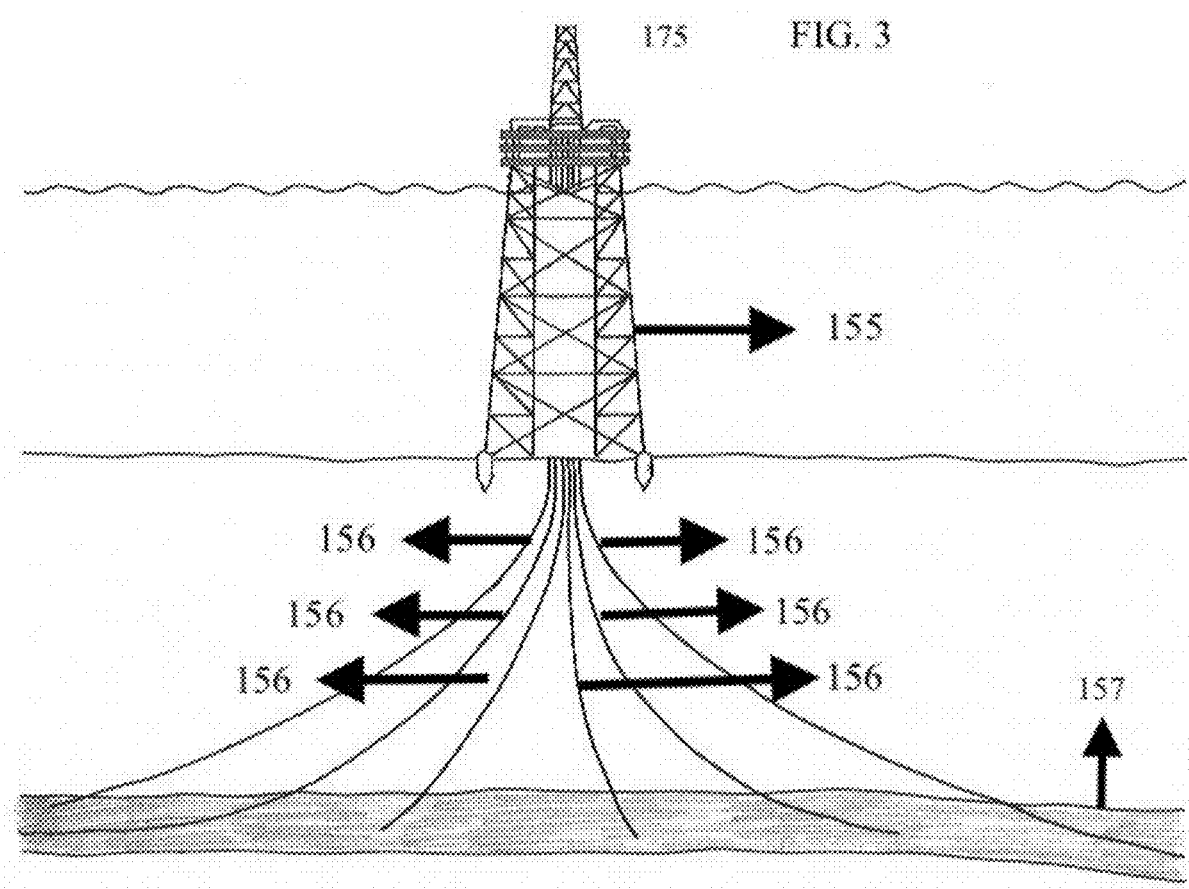
FIG. 3 illustrates a geological image of directional drilling, in accordance with the principles of the present disclosure.

FIG. 3 shows a geological image of directional drilling 175. The drilling rigs 155 allow the oil and gas rich shale 157 to be accessed via horizontal drilling techniques from the wellbore 156.

Figure 4:
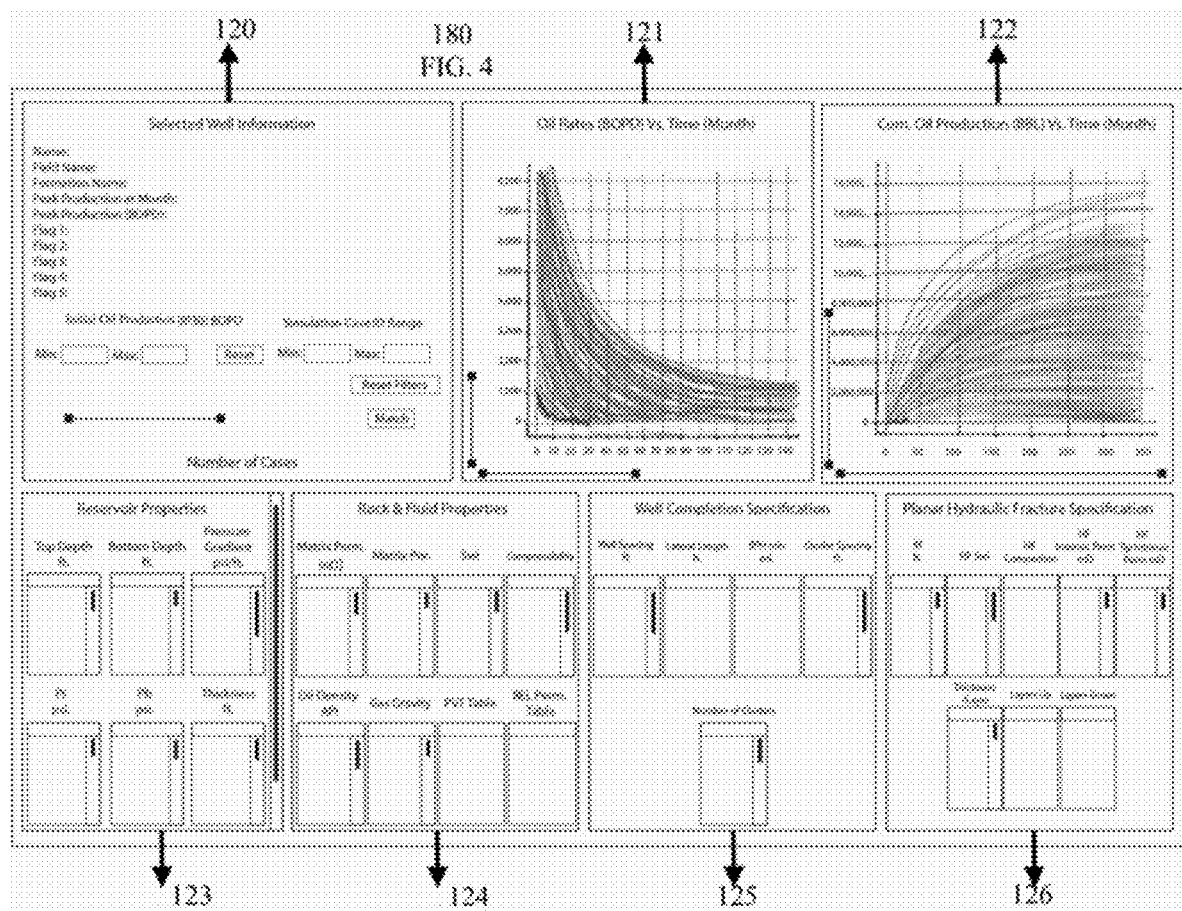
FIG. 4 illustrates one example embodiment of a user interface for a subsurface parameters' analysis, in accordance with the principles of the present disclosure.

FIG. 4 illustrates a user interface for a subsurface parameters' analysis 180, according to the present disclosure. The subsurface parameters' analysis 180 shows the decline curve analysis that appears to a user on his or her display. A window for selected well information 120 appears in the upper left of the screen. The user has the ability to select different variables, available to the user, such as reservoir properties 123, rock and fluid properties 124, well completion specification data 125, and planar hydraulic fracture specification 126. The graphs appearing to the right of the window for the selected well information 120 includes a graph of an oil rate vs. time simulation 121 and a graph of a cumulative oil production vs. time simulation 122, in accordance with an exemplary embodiment of the present disclosure.

Figure 5:
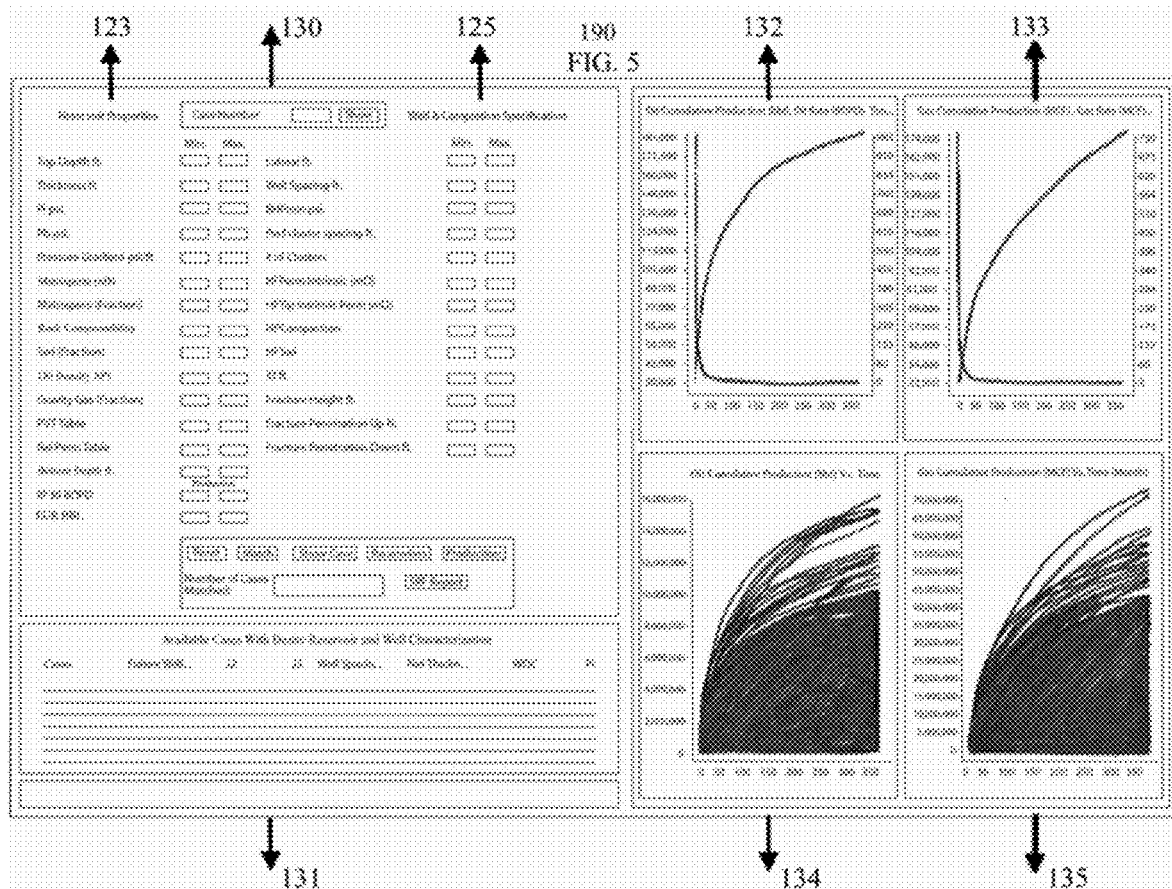
FIG. 5 illustrates one example embodiment of a user interface for shale assessment/future type wells analysis, in accordance with the principles of the present disclosure.

FIG. 5 illustrates a user interface for shale assessment/future type wells analysis 190, according to the present disclosure. In the upper left of the screen appears a window for case specific data 130 that includes the ranges of the specified parameters for the reservoir properties 123 and the well completion specification data 125. The ranges of the specified parameters comprise a low and high variable, varied by source. Available graphs appearing in the upper right of the screen are a graph of an oil cumulative production oil rate simulation 132 and a graph of a gas cumulative production gas rate simulation 133. Graphs appearing in the lower right of the screen are a graph of an oil cumulative production vs. time simulation 134 and a graph of a gas cumulative production vs. time simulation 135. In the lower left of the screen appears a window for a list of available cases with desired reservoir and well characterization 131.

Figure 6:
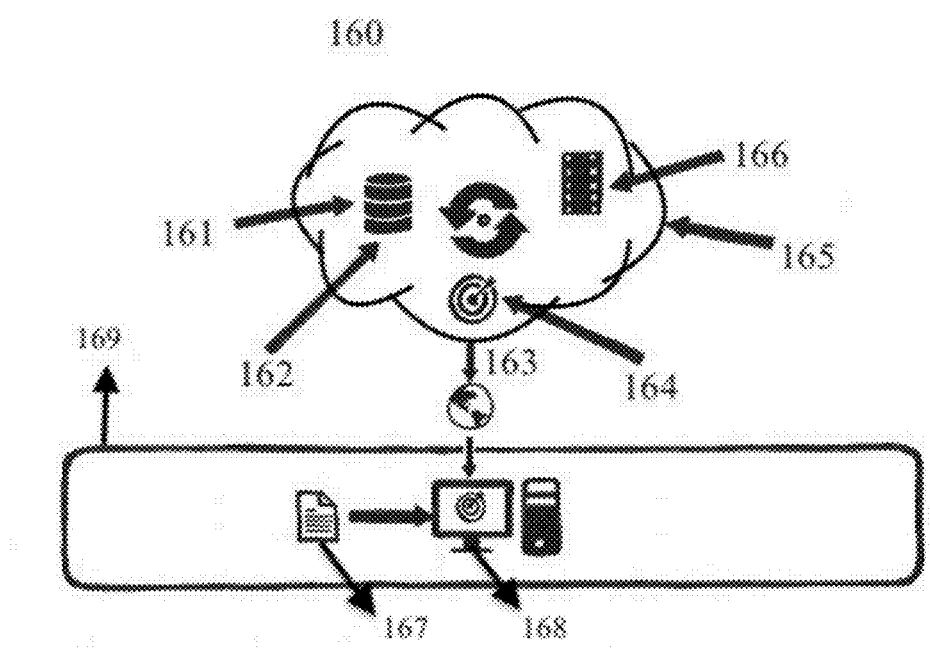
FIG. 6 illustrates an exemplary embodiment of the components of cloud computing, a data processing system, in accordance with the principles of the present disclosure.

FIG. 6 illustrates an exemplary embodiment of the components of cloud computing, a data processing system 160, according to the present disclosure. The data processing system 160 includes one or more computers 168, one or more databases 161, and one or more networks 163. The one or more databases 161 contains a plurality of simulation curves 162. The plurality of simulation curves 162 is matched to actual wellsite data 167 using high performance computing, containing a virtual server 166 and a virtual private cloud 165. The desired outcome is uploaded to the one or more networks 163 and stored in the one or more computers 168. A client firewall 169 contains the actual wellsite data 167 uploaded locally by a user to an analytical software 164 displayed on the one or more computers 168. The data processing system 160 has associated therewith the one or more databases 161, the plurality of simulation curves 162, the analytical software 164, the virtual server 166, and the virtual private cloud 165, according to the data processing methodology of FIG. 6.

Figure 7:
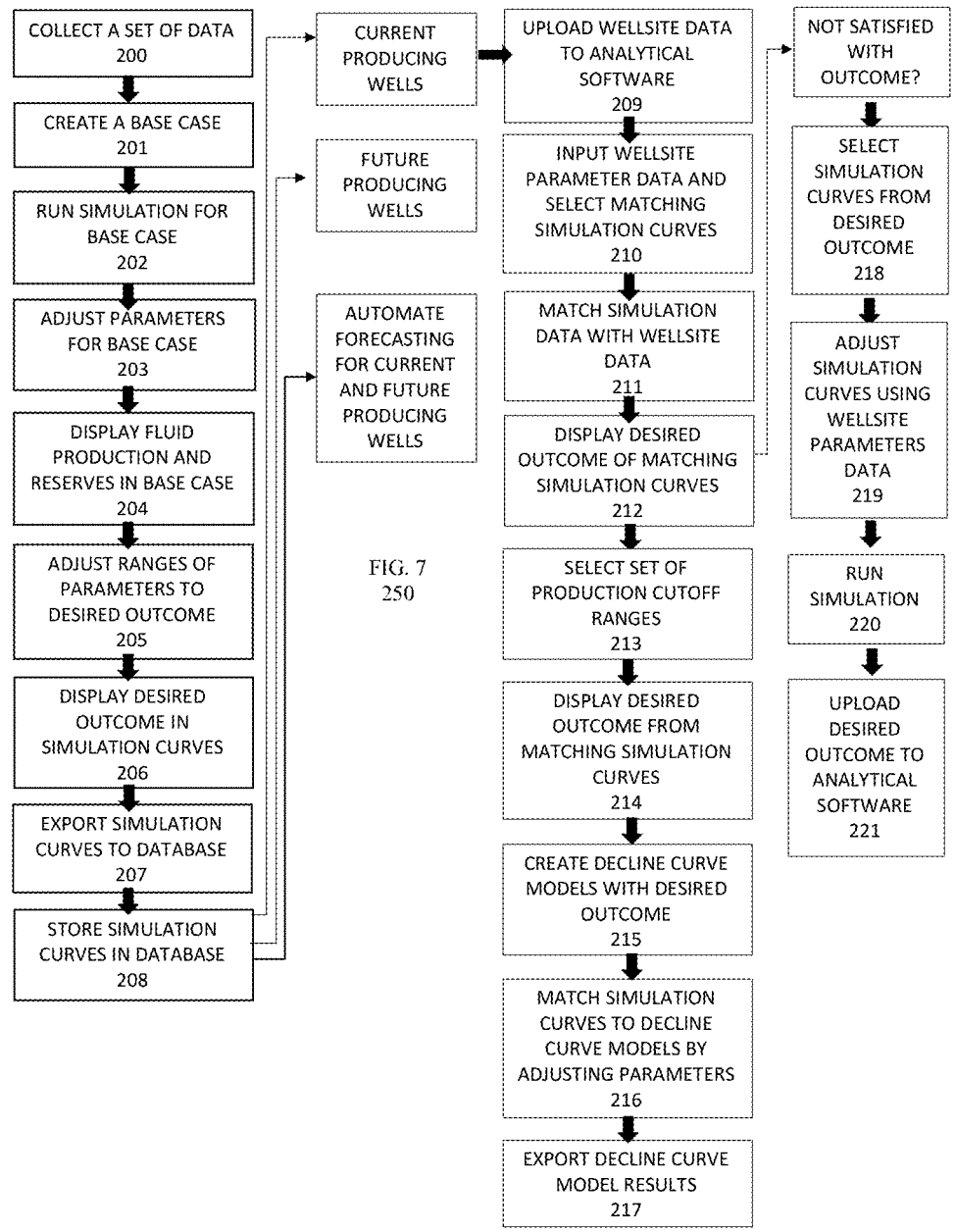
FIG. 7 illustrates a block diagram of a method for predicting oil and gas reservoir production in current producing wells, in accordance with the principles of the present disclosure.
Figure 8:
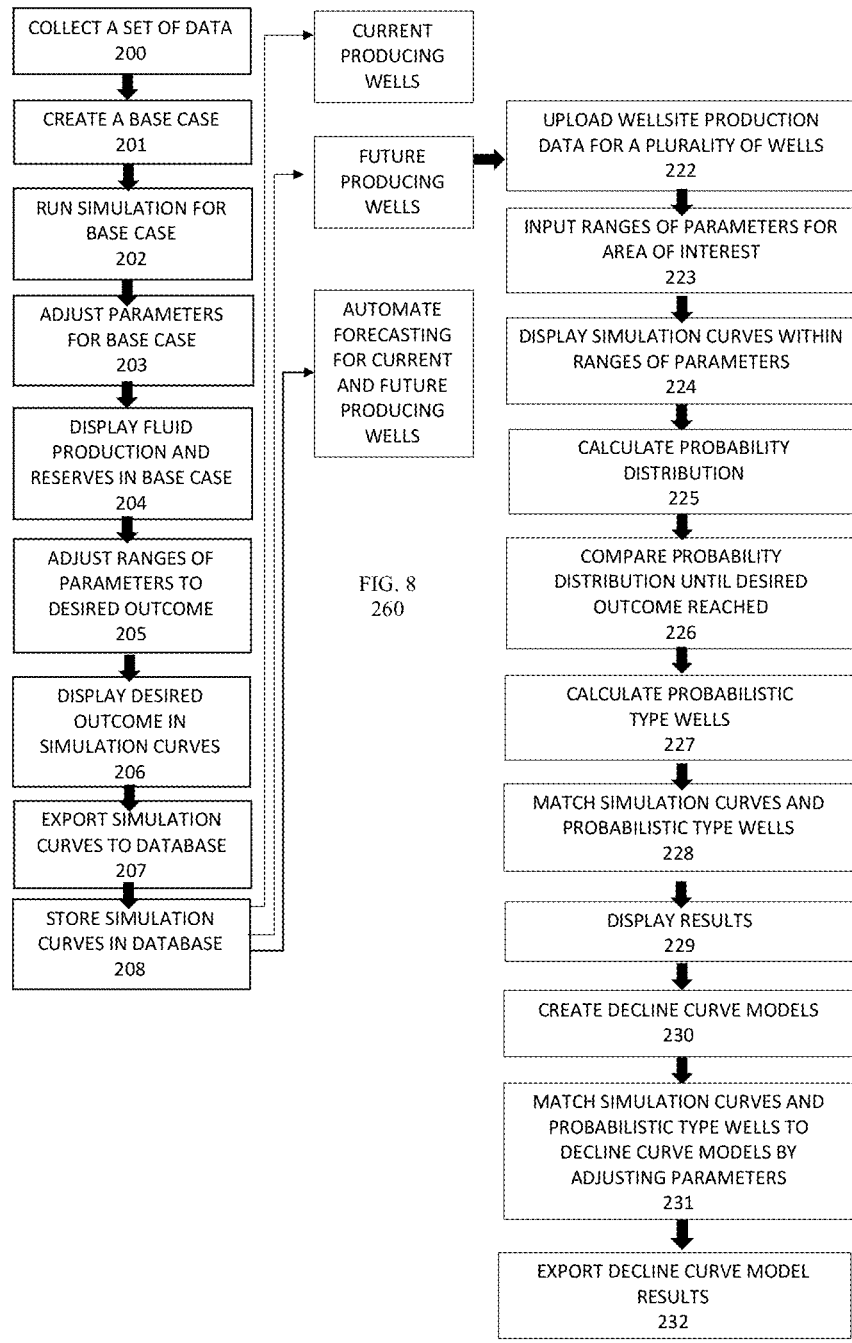
FIG. 8 illustrates a block diagram of a method for predicting oil and gas reservoir production in future producing wells, in accordance with the principles of the present disclosure.

FIG. 7, FIG. 8, and FIG. 9 illustrate a block diagram of a method for predicting oil and gas reservoir production. A set of data is collected 200 to generate ranges of specified parameters for one or more oil and gas reservoirs in order to create a base case 201. The base case is created 201 in a simulation software using the set of data collected 200. Simulation is run on the base case 202. The specified parameters for the base case are then adjusted 203. The ranges of the specified parameters and the base case are used to display a plurality of fluid production and reserves in the simulation software 204. The ranges of the specified parameters are adjusted to obtain a desired outcome 205. The desired outcome is then displayed in a plurality of simulation curves 206. The user exports the plurality of simulation curves to a database 207 and stores the plurality of simulation curves in the database 208 for future use.

FIG. 7 further illustrates additional steps for predicting oil and gas reservoir production in current producing wells 250. For current producing wells, a set of actual wellsite production data, actual wellsite pressure data, and actual wellsite parameter data is uploaded to an analytical software 209. The actual wellsite parameter data is inputted, and a user selects a plurality of matching simulation curves 210. Simulation production data and simulation pressure data from the plurality of matching simulation curves is matched with the actual wellsite production data and the actual wellsite pressure data 211. The desired outcome is displayed containing the plurality of matching simulation curves 212. If the user is unsatisfied with the outcome, the user selects the plurality of simulation curves from the desired outcome 218 and adjusts the plurality of simulation curves using the actual wellsite parameter data 219. Simulation is then run for the plurality of simulation curves to optimize the desired outcome 220 and the desired outcome from the plurality of simulation curves is uploaded to the analytical software 221. However, if the user is satisfied with the desired outcome displayed containing the matching simulation curves 212, the user proceeds by selecting a set of production cutoff ranges 213. The desired outcome is displayed containing the plurality of matching simulation curves 214. A plurality of decline curve models is created containing the desired outcome 215. The desired outcome from the plurality of matching simulation curves is matched to the plurality of decline curve models by adjusting a plurality of decline curve parameters 216. The user then exports the plurality of decline curve models results into user desired format 217.

FIG. 8 further illustrates additional steps for predicting oil and gas reservoir production in future producing wells 260. In future producing wells, a set of actual wellsite production data for a plurality of wells is uploaded to an analytical software by the user 222. The ranges of the specified parameters are inputted for desired areas of interest 223. The plurality of simulation curves is displayed within the ranges of the specified parameters previously input 224. Probability distribution of the plurality of simulation curves and the actual wellsite production data for the plurality of wells is calculated 225 and then compared by adjusting the ranges of the specified parameters until the desired outcome reached 226. Probabilistic type wells are calculated from the desired outcome 227 and matched to the plurality of simulation curves 228. The plurality of simulation curves and the probabilistic type wells results are displayed 229. A plurality of decline curve models is then created with the desired outcome 230. The plurality of simulation curves and the probabilistic type wells are matched to the plurality of decline curve models by adjusting a plurality of decline curve parameters 231. The plurality of decline curve models' results is then exported into user desired format 232.

FIG. 9 further illustrates additional steps for predicting oil and gas reservoir production, to automate forecasting for current and future producing wells 270. To automate forecasting for current and future producing wells, a set of actual wellsite production data, actual wellsite pressure data, and the ranges of the specified parameters for actual wellsite parameter data is uploaded to an analytical software for a plurality of wells 233. A set of production cutoff ranges is selected 234. The user then inputs a specified number of a plurality of matching simulation curves desired for one or more actual wellsites 235. The ranges of the specified parameters from the plurality of simulation curves are matched with the ranges of the specified parameters of the actual wellsite parameter data to generate a plurality of matching simulation curves 236. The simulation production data and simulation pressure data from the plurality of simulation curves is matched with the actual wellsite production data and the actual wellsite pressure data 237. Steps 236 and 237 are repeated until the desired outcome is obtained for the plurality of wells 238. The plurality of matching simulation curves for the plurality of wells is displayed 239. A plurality of decline curve models is displayed with the desired outcome 240. The plurality of simulation curves is matched to the plurality of decline curve models by adjusting a plurality of decline curve parameters for the plurality of wells 241. The plurality of decline curve models results for the plurality of wells are exported into user desired format 242. Matches for the plurality of wells are grouped for desired areas of interest 243. The ranges of the specified parameters from the matches, the plurality of matching simulation curves, and the plurality of decline curve models are displayed for the desired areas of interest 244. The ranges of the specified parameters are adjusted to optimize the desired outcome 245. Probabilistic type wells are calculated from the plurality of matching simulation curves and the plurality of decline curve models 246 and then matched by adjusting the plurality of decline curve parameters for the desired areas of interest 247. The plurality of decline curve parameters for the plurality of type wells are then exported into user desired format 248.

The foregoing description of some embodiments of the disclosure has been presented for purposes of illustration and description. It is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. It should be understood that various changes, substitutions and alterations can be made hereto without departing from the spirit and scope of the disclosure.

The invention claimed is:

1. A method of predicting oil and gas reservoir production in current and future producing wells, the method comprising:

receiving, by a data collection module, a set of data comprising ranges of specified parameters of an oil and gas reservoir associated with at least one wellsite to generate a plurality of simulation curves for the oil and gas reservoir associated with the at least one wellsite, the ranges having a low variable and a high variable, wherein the at least one wellsite comprises a wellbore penetrating a subterranean formation for extracting fluid from the oil and gas reservoir therein;

creating and running, by a simulation module, a base case simulation from the ranges of specified parameters for the oil and gas reservoir associated with the at least one wellsite;

using a simulation module user interface to:
adjust the ranges of specified parameters for the base case simulation to obtain an outcome of the base case simulation;
display a plurality of fluid production and reserves based on the adjusted ranges of specified parameters and the outcome of the base case simulation;
display the outcome of the base case simulation in the plurality of simulation curves on a display in the simulation module;
export and store the plurality of simulation curves into a database in a virtual server and a virtual private cloud;

uploading from a client firewall, by an analytical module, a set of actual wellsite data comprising production data, pressure data, and parameter data;

using an analytical module user interface to:
input the actual wellsite parameter data and select the ranges of specified parameters to display the plurality of simulation curves from the database in the virtual server and the virtual private cloud;
match simulation production data and simulation pressure data from the plurality of simulation curves from the database in the virtual server and the virtual private cloud with the actual wellsite production data and the actual wellsite pressure data to obtain a plurality of matching simulation curves;
display an outcome of the plurality of matching simulation curves on a display in the analytical module;
calculate a probability distribution for the outcome of the plurality of matching simulation curves;
create a plurality of decline curve models with the outcome of the plurality of matching simulation curves;
match the outcome of the plurality of matching simulation curves to the plurality of decline curve models by adjusting a plurality of decline curve parameters; and
export the adjusted plurality of decline curve models for the current and the future producing wells into a user format for economic analysis;
re-select the ranges of specified parameters for adjusting the probability distribution for the current and the future producing wells until achieving an optimal economic result, and using the adjusted probability distribution to perform a drilling operation to drill another wellbore at the oil and gas reservoir.

2. The method of predicting oil and gas reservoir production as in claim 1, wherein the simulation module comprises Computer Modelling Group reservoir simulation software or Petrel Reservoir Engineering Eclipse simulation software.

3. The method of predicting oil and gas reservoir production as in claim 1, wherein the database comprises a Relational Database System.

4. The method of predicting oil and gas reservoir production as in claim 1, wherein the analytical module comprises Spotfire.

5. The method of predicting oil and gas reservoir production of claim 1, wherein the analytical module comprises a parameters window, wherein the ranges of the specified parameters are selected in the parameters window.

6. The method of predicting oil and gas reservoir production as in claim 1, wherein the decline curve model is based on Arps decline curve analysis.

7. The method of predicting oil and gas reservoir production as in claim 1, wherein the decline curve parameters are based on Arps parameters.

\* \* \* \* \*